Dec. 20, 1966 W. A. YONKERS 3,293,350
ARRANGEMENT FOR MAINTAINING SHORT TERM THERMAL STABILITY
OF AN ELECTRICAL CURRENT-CARRYING COMPONENT
Filed May 12, 1964
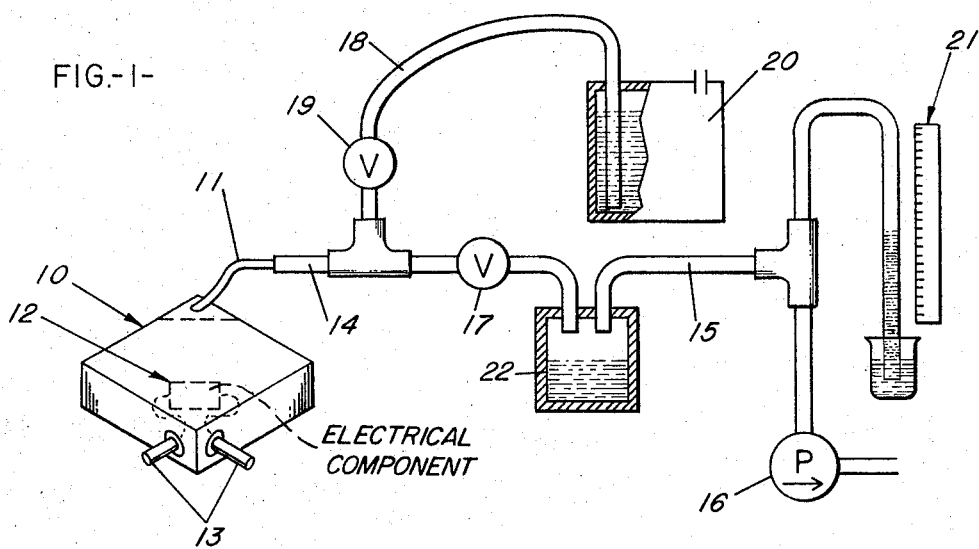
FIG.-1-
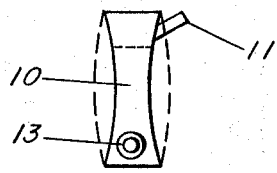
FIG.-2-
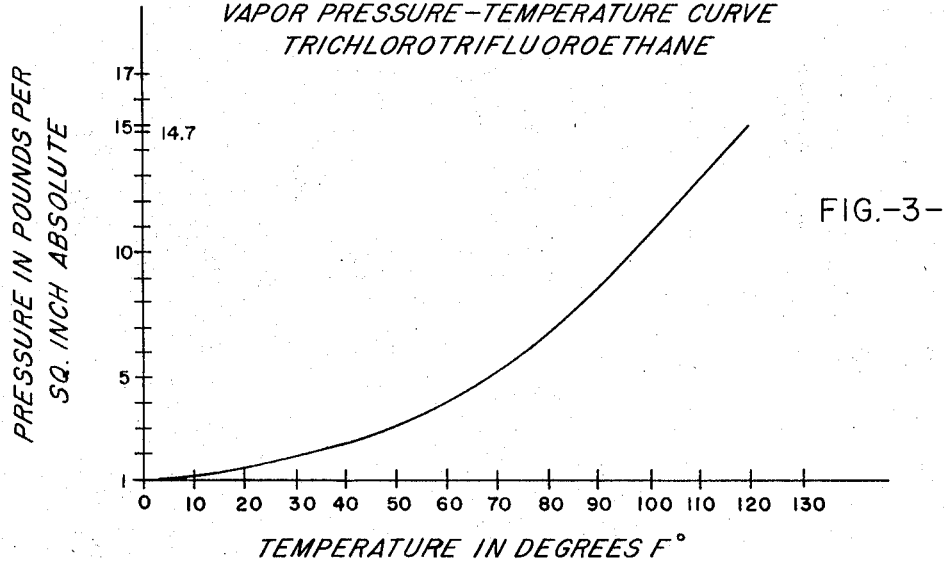
FIG.-3-
INVENTOR.
WILLIAM A. YONKERS
BY
ATTORNEY

3,293,350
ARRANGEMENT FOR MAINTAINING SHORT TERM THERMAL STABILITY OF AN ELECTRICAL CURRENT-CARRYING COMPONENT

William A. Yonkers, Mountain Lakes, N.J., assignor to Radio Frequency Laboratories, Inc., Boonton, N.J., a corporation of New Jersey
Filed May 12, 1964, Ser. No. 366,776
2 Claims. (Cl. 174—15)

This invention relates to an arrangement for maintaining thermal stability of electrical components and more particularly to an arrangement for stabilizing the short term thermal drift of an electrical component when the current flowing therethrough has a magnitude such that the component becomes heated.

In precision electrical measuring apparatus, it is essential to maintain integrity of the measurement under conditions of varying temperature. The effect of ambient temperature variations upon certain circuit parameters can be either eliminated or at least reduced to acceptable limits by means of various temperature-compensating arrangements. In the case of measuring apparatus of the high precision class, it is the general practice to place the apparatus in a room maintained at a constant temperature, as well as humidity, rather than place reliance upon temperature and/or humidity compensating arrangements. In certain apparatus such as, for example, apparatus designed for calibrating or checking electrical indicating instruments within 0.05% accuracy, other spurious thermal effects must be reckoned with. For example, instrument calibrators include numerous electrical shunts designed for various measuring ranges, from milliamperes to amperes. Shunts for carrying currents in the milliamperes range can be designed so that the flow of the rated current therethrough does not significantly change the shunt resistance. However, in the case of a shunt intended to carry 30 amperes, or more, size and weight factors impose design limitations such that the flow of the rated current through the shunt generates significant heat. The resulting change in the shunt resistance alters the electrical circuit constants and results in a displacement of the pointer of the electrical indicating instrument. Thus, when the calibrating apparatus is in use, switching the circuit to a different shunt carrying a greater current results in a slow drift of the instrument pointer as the shunt heats up. This requires the operator to wait until the second shunt has reached thermal equilibrium before the measurement can be relied upon, which, in some cases, may required several minutes. The present invention is directed to an arrangement for eliminating the time normally required for a self-heating current-carrying component to reach thermal stability.

An object of this invention is the provision of an arrangement for stabilizing the short term thermal drift of electrical components which produce heat upon the flow of current therethrough.

An object of this invention is the provision of an arrangement for immediately dissipating the heat generated by a self-heating electrical component, which arrangement comprises enclosing the component in a sealed housing containing a liquid normally maintained at a reduced pressure.

An object of this invention is the provision of an arrangement for maintaining a current-carrying electrical component in a condition of stable thermal equilibrium after the start of current flow therethrough, which arrangement comprises immersing the component in an inert liquid contained within a sealed housing, said liquid partially filling the housing, the remainder of the housing being evacuated and containing only the vapor of the said liquid.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a diagrammatic representation showing a current-carrying component disposed in a housing and apparatus for filling the housing with a suitable liquid filling medium;

FIGURE 2 is a side view of the sealed housing; and

FIGURE 3 is a vapor pressure-temperature curve of a suitable filling medium.

Reference now is made to FIGURE 1, wherein there is shown a generally rectangular housing, or can 10, (made of a suitable metal such as, for example, stainless steel) and having a filling tube 11 soldered or welded thereto. Disposed within the housing, preferably proximate to the bottom thereof, is a current-carrying component identified by the numeral 12, which component is connected to header-type connection terminals 13.

The filler tube 11 is connected to the lines 14 and 15 of a vacuum pump 16, the line 14 being provided with a shut-off valve 17. Joined to the line 14 is a line 18 provided with a shut-off valve 19 and extending into a vessel 20 carrying a supply of a suitable liquid filling medium such as, for example, trichlorotrifluoroethane. With the valve 17 open and the valve 19 closed, the vacuum pump is operated to exhaust the interior of the can to a pressure of approximately 22 millimeters of mercury, as indicated by the vacuum gauge 21. The valve 17 is now closed and the pump stopped, after which the valve 19 is opened, thereby resulting in a flow of the liquid into the can. At this point, the can is substantially but not completely filled, as indicated by the dotted line.

The valve 19 now is closed and the valve 17 is opened. The pump again is operated to exhaust all of the air from the can, the reservoir 22 serving to collect the liquid vapor carried over during such exhausting process. This second exhausting cycle is continued until the pressure in the can is reduced to a desired level, consideration being given to the particular filling medium and the range of ambient temperature values to which the component-carrying can is to be subjected. Thus, in the case of a selected ambient temperature range of 20 to 140 degrees Fahrenheit, the second exhausting step is carried on until the pressure within the can is of the order of a few pounds per square inch, absolute. The filler tube 11, which may be made of copper having pre-tinned outer and inner surfaces, is now collapsed and heated, by means of a suitable tool, thereby to seal the tube at a point close to the can surface. That portion of the tube extending beyond the seal may be cut off whereby the sealed, component-carrying can is ready for incorporation in the particular apparatus.

Referring to the curve shown in FIGURE 3, and assuming the can has been exhausted and filled at a room temperature of 65 degrees Fahrenheit, the second exhausting step would be carried on until the pressure above the contained liquid is about 5 pounds per square inch absolute. Under this condition, the pressure within the can will be below atmospheric pressure when the ambient temperature is below about 120 degrees Fahrenheit and the relatively thin side walls of the can are bowed-in, as shown in FIGURE 2. At ambient temperatures above 120 degrees Fahrenheit, a positive pressure is developed within the can whereby the sides bulge out, as shown by the dotted lines, thereby increasing the volume of the can.

Consequently, the temperature of the can and the contained liquid may be elevated substantially above 120° F. without fear of the can exploding due to the expansion of the contained liquid.

Assume, now, that the component is connected into an electrical circuit and the normal current flow therethrough is of a magnitude to cause heating thereof. The elevated temperature of the component causes the liquid in contact therewith to pass from the liquid to the vapor phase, thereby resulting in the formation of bubbles. As these bubbles rise toward the surface of the liquid, they are replaced by relatively cooler liquid at the component surface. By placing the component proximate to the bottom of the can, a maximum volume of relatively cool liquid is available for cooling of the component by surface contact, it being assumed that the liquid has previously reached temperature saturation at room temperature. Also, such placement of the component, within the can, provides a maximum volume of relatively cool liquid for effecting a rapid transfer of heat from the bubbles as they pass to the surface of the liquid.

As is common in conventional liquid cooling arrangements, it is desirable to make the total surface area of the can as large as possible, within the physical limits dictated by space considerations in the particular apparatus incorporating the component. This is to maintain the temperature difference between the can and the atmosphere as small as possible, thereby providing good heat dissipation.

In general, precision electrical calibrating apparatus is designed for operation at normal room temperatures. However, such apparatus may be exposed to temperatures from below 0° F. to above 120° F., as during shipment or storage. Therefore, the liquid cooling medium, employed in the practice of this invention, should have a normal boiling point, under atmospheric pressure, somewhere in the neighborhood of 120° F. so that the pressure within the can will not become excessive at the elevated temperature. Yet, the boiling point of the selected liquid must not be so high that ebullition does not take place over the normal temperature range within which the apparatus is intended to be used. Further, the liquid should be stable, chemically and thermally inert and possess a suitable dielectric property. Trichlorotrifluoroethane meets these requirements, but other compounds, particularly of the fluorocarbon family, are satisfactory for specific applications of the type contemplated by this invention.

Although the arrangement has been described with reference to an electrical shunt, it will be apparent it is applicable to any current-carrying component which normally is heated by the passage of current therethrough. Further, a plurality of such components may be contained within a single can.

Having now described the invention, those skilled in this art will be able to make various changes and modifications without thereby departing from the scope and spirit of the invention as set forth in the following claims.

I claim:
1. An improved arrangement for cooling an electrical component over a predetermined ambient temperature range comprising,
   (a) a sealed can having opposed normally-flat side walls which bow inwardly and outwardly when the internal pressure is below and above atmospheric pressure, respectively,
   (b) a liquid partially filling the can, said liquid having a boiling point, at atmospheric pressure, substantially equal to the upper limit of the predetermined ambient temperature range, the space above the liquid being filled solely by the vapor of the liquid and the internal pressure of the can being approximately 5 pounds per square inch absolute at a temperature of 65° F.,
   (c) an electrical component immersed in the liquid and proximate to the bottom of the can, and
   (d) electrical terminals carried by the can and connected to the component, the arrangement being such that the liquid in contact with the component passes to the vapor stage when the component temperature exceeds that of the liquid, and the side walls of the can bow outwardly when the temperature of the liquid exceeds the upper limit of the said predetermined ambient temperature range.
2. The invention as recited in claim 1 wherein the liquid is trichlorotrifluoroethane.

References Cited by the Examiner
UNITED STATES PATENTS 2,886,746  5/1959  Saby.
3,024,298  3/1962  Goltsos et al. _____ 174—15

LEWIS H. MYERS, *Primary Examiner.*

J. F. RUGGIERO, *Assistant Examiner.*